United States Patent
Li et al.

(10) Patent No.: US 7,646,569 B2
(45) Date of Patent: Jan. 12, 2010

(54) PINNED LAYER IN MAGNETORESISTIVE SENSOR

(75) Inventors: Jinshan Li, San Jose, CA (US); Kouichi Nishioka, Hiratsuka (JP); Satoshi Shigematsu, Kanagawa (JP); Alexander M. Zeltser, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 568 days.

(21) Appl. No.: 11/458,896

(22) Filed: Jul. 20, 2006

(65) Prior Publication Data

US 2008/0019059 A1    Jan. 24, 2008

(51) Int. Cl.
G11B 5/127 (2006.01)
(52) U.S. Cl. .................................. 360/324.11
(58) Field of Classification Search .............. 360/324.1, 360/324.12, 324.2, 324.11
See application file for complete search history.

(56) References Cited

U.S. PATENT DOCUMENTS

| | | | |
|---|---|---|---|
| 5,793,279 A * | 8/1998 | Nepela | 338/32 R |
| 6,657,830 B2 | 12/2003 | Ito et al. | |
| 6,828,610 B2 * | 12/2004 | Anthony et al. | 257/293 |
| 6,828,897 B1 * | 12/2004 | Nepela | 338/32 R |
| 6,905,780 B2 | 6/2005 | Yuasa et al. | |
| 6,917,499 B2 | 7/2005 | Ito et al. | |
| 6,923,860 B1 | 8/2005 | Karr et al. | |
| 6,946,834 B2 * | 9/2005 | Van Zon et al. | 324/252 |
| 7,173,796 B2 * | 2/2007 | Freitag et al. | 360/324.1 |
| 2002/0150791 A1 | 10/2002 | Yuasa et al. | |
| 2006/0211198 A1 * | 9/2006 | Horng et al. | 438/257 |
| 2007/0019339 A1 * | 1/2007 | Gill | 360/324.2 |
| 2007/0070556 A1 * | 3/2007 | Zhang et al. | 360/324.11 |
| 2007/0243638 A1 * | 10/2007 | Horng et al. | 438/3 |
| 2007/0268633 A1 * | 11/2007 | Horng et al. | 360/324.12 |
| 2008/0074807 A1 * | 3/2008 | Carey et al. | 360/324.11 |
| 2008/0142156 A1 * | 6/2008 | Djayaprawira et al. | 156/280 |
| 2008/0180863 A1 * | 7/2008 | Gill | 360/324.2 |
| 2008/0202917 A1 * | 8/2008 | Djayaprawira et al. | 204/192.1 |

* cited by examiner

*Primary Examiner*—Allen T Cao
(74) *Attorney, Agent, or Firm*—Patterson & Sheridan, L.L.P.

(57) ABSTRACT

A method for manufacturing a magnetic read sensor and a magnetic read sensor are provided. In one embodiment of the invention, the method includes providing a seed layer disposed over a substrate of the magnetic read sensor, providing a free layer disposed over a seed layer and providing a spacer layer disposed over the free layer. The method further includes providing a pinned layer disposed over the spacer layer. In one embodiment, the pinned layer includes cobalt and iron, wherein the concentration of iron in the pinned layer is between 33 and 37 atomic percent (at. %). The method further includes providing a pinning layer disposed over the pinned layer, wherein the pinning layer is in contact with the pinned layer.

27 Claims, 6 Drawing Sheets

PINNED LAYER IN MAGNETORESISTIVE SENSOR

BACKGROUND OF THE INVENTION

1. Field of the Invention

Embodiments of the present invention generally relate to a magnetic read sensor. Specifically, embodiments of the invention relate to the composition of a pinned layer in a magnetoresistive read sensor.

2. Description of the Related Art

Modern computer systems typically include a hard drive which may be used as mass storage for the computer system. Information in the hard drive is typically stored as magnetic charge on one or more magnetic disks within the hard drive. To read the information, the hard drive includes a magnetic read sensor which senses the magnetic charge as the magnetic disks spin beneath or above the magnetic read sensor.

Modern magnetic read sensors typically include several layers of material deposited on a substrate. As the magnetic read sensor passes over an area of a magnetic disk in which a magnetic charge is present, the magnetic charge may induce a detectable change in the layers of material in the magnetic read sensor. For example, during a read operation, a current may be applied to the layers of material in the magnetic read sensor. The current applied to the layers of material may create a voltage across the layers of material which is proportional to the resistance of the layers of material. As the sensor passes over a magnetic charge on the magnetic disk, the magnetic charge may cause a change in the combined resistance of the layers of material (e.g., an increase or decrease in the resistance of the layers of material). The stored magnetic charge may then be measured via a corresponding change in the voltage across the layers of material (e.g., a corresponding increase or decrease in the voltage resulting from the current applied to the layers of material).

One type of magnetic read sensor is a spin valve. A spin valve typically contains a free layer, an anti-parallel (AP) pinned layer, and an antiferromagnetic (AFM) pinning layer. The pinned layer has a magnetic moment which is pinned (fixed) in a given direction by the pinning layer and which typically is not easily rotated by external magnetic fields. The free layer has a magnetic moment which is not pinned and can be easily rotated by external magnetic fields. The resistance of the GMR sensor is typically given by the formula $R=R_{\mu\mu}+(R_{\mu o}-R_{\mu\mu})(1-\cos\Theta)/2$. Here $R_{\mu\mu}$ is the sensor resistance when pinned and free layer moments are parallel ($\Theta=0$), $R_{\mu o}$ is the sensor resistance when the pinned and free layer moments are anti-parallel ($\Theta=\pi$), and $\Theta$ is the angle between free and pinned layer and $R_{\mu\mu}<<R_{\mu o}$. Thus when the magnetic moment of the free layer is parallel to the magnetic moment of the pinned layer, the resistance of the read sensor may be decreased, and when the magnetic moment of the free layer is not parallel to the magnetic moment of the pinned layer the resistance of the read sensor may be increased. As described above, the change in resistance of the magnetic read sensor may be used to read the pattern of magnetic transitions present on a magnetic disk.

Several factors may affect the manufacture and operation of the magnetic read sensor. For example, high exchange coupling between the AFM layer and pinned layer which is typically quantified by a high magnetic pinning field (Hp) is typically desired for pinning the pinned layer. When the pinning field is high, the orientation of the magnetic moment of the pinned layer may not be easily affected by other magnetic fields, thereby limiting noise, ensuring linear behavior of the magnetic read sensor, and maintaining a large change in resistance of the magnetic read sensor during operation.

Another aspect of the pinned layer is the coercivity (Hcp) of the pinned layer. The coercivity affects how susceptible the magnetic moment of the pinned layer is to being permanently modified, e.g., due to inadvertent heating during manufacturing of the magnetic read sensor or due to a high magnetic field being applied to the layer inadvertently during manufacture. Typically, a low coercivity is desired so that such incidental aspects of the manufacturing process are not detrimental to the pinned magnetic moment of the pinning layer.

Yet another aspect of the pinned layer is the blocking temperature (Tb) of the pinned layer. Typically, as the temperature of a pinned layer is increased, the strength of the magnetic pinning field of the pinned layer decreases. The blocking temperature is typically defined as the temperature at which the magnetic pinning field of the pinned layer is reduced to zero. In order to maintain a high pinning field (and thus, an increased resistance change/sensitivity of the magnetic read sensor) across a variety of temperatures, a high blocking temperature is typically desired. A high blocking temperature may also prevent damage to the pinned layer if the pinned layer is inadvertently heated during manufacturing of the magnetic read sensor. Thus, a magnetic read sensor is desired which provides a pinned layer with a high pinning field, low coercivity, and high blocking temperature.

Accordingly, what is needed is a magnetic read sensor with an improved pinned layer.

SUMMARY OF THE INVENTION

Embodiments of the present invention generally provide a magnetic read sensor and a method for manufacturing a magnetic read sensor. The method includes providing a seed layer disposed over a substrate of the magnetic read sensor, providing a free layer disposed over a seed layer, and providing a spacer layer disposed over the free layer. The method further includes providing a pinned layer disposed over the spacer layer. In one embodiment, the pinned layer includes cobalt and iron, wherein the concentration of iron in the pinned layer is between 33 and 37 atomic percent (at. %). The method further includes providing a pinning layer disposed over the pinned layer, wherein the pinning layer is in contact with the pinned layer.

One embodiment of the invention provides a magnetic read sensor. The magnetic read sensor includes a seed layer disposed over a substrate of the magnetic read sensor, free layer disposed over a seed layer, a spacer layer disposed over the free layer, and a pinned layer disposed over the spacer layer. In one embodiment, the pinned layer includes cobalt and iron, wherein the concentration of iron is between 33 and 37 atomic percent (at. %). The magnetic read sensor also includes a pinning layer disposed over the pinned layer, wherein the pinning layer is in contact with the pinned layer.

One embodiment of the invention provides a hard drive including a magnetic disk, an arm rotatably mounted to move over the magnetic disk, and a magnetic read sensor connected to an end of the arm, wherein the magnetic read sensor is one of a top-spin valve, a dual spin valve, and a top tunneling magnetoresistive read sensor. In one embodiment, the magnetic read sensor includes a pinned layer disposed over the spacer layer. In one embodiment, the pinned layer includes cobalt and iron, wherein the concentration of iron is between 33 and 37 atomic percent (at. %). The magnetic read sensor further includes a pinning layer disposed over the pinned layer, wherein the pinning layer is in contact with the pinned layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Embodiments of the present invention generally provide a magnetic read sensor and a method for manufacturing a magnetic read sensor. The method includes providing a seed layer disposed over a substrate of the magnetic read sensor, providing a free layer disposed over the seed layer, and providing a spacer layer disposed over the free layer. The method further includes providing a pinned layer disposed over the spacer layer. In one embodiment, the pinned layer includes cobalt and iron, wherein the concentration of iron in the pinned layer is between 33 and 37 atomic percent (at. %). The method further includes providing a pinning layer disposed over the pinned layer, wherein the pinning layer is in contact with the pinned layer. In some cases, such a magnetic read sensor may have a pinned layer with an increased pinning field and a low coercivity without any adverse effect on the blocking temperature of the pinned layer.

An Exemplary Hard Drive

Figure 1:
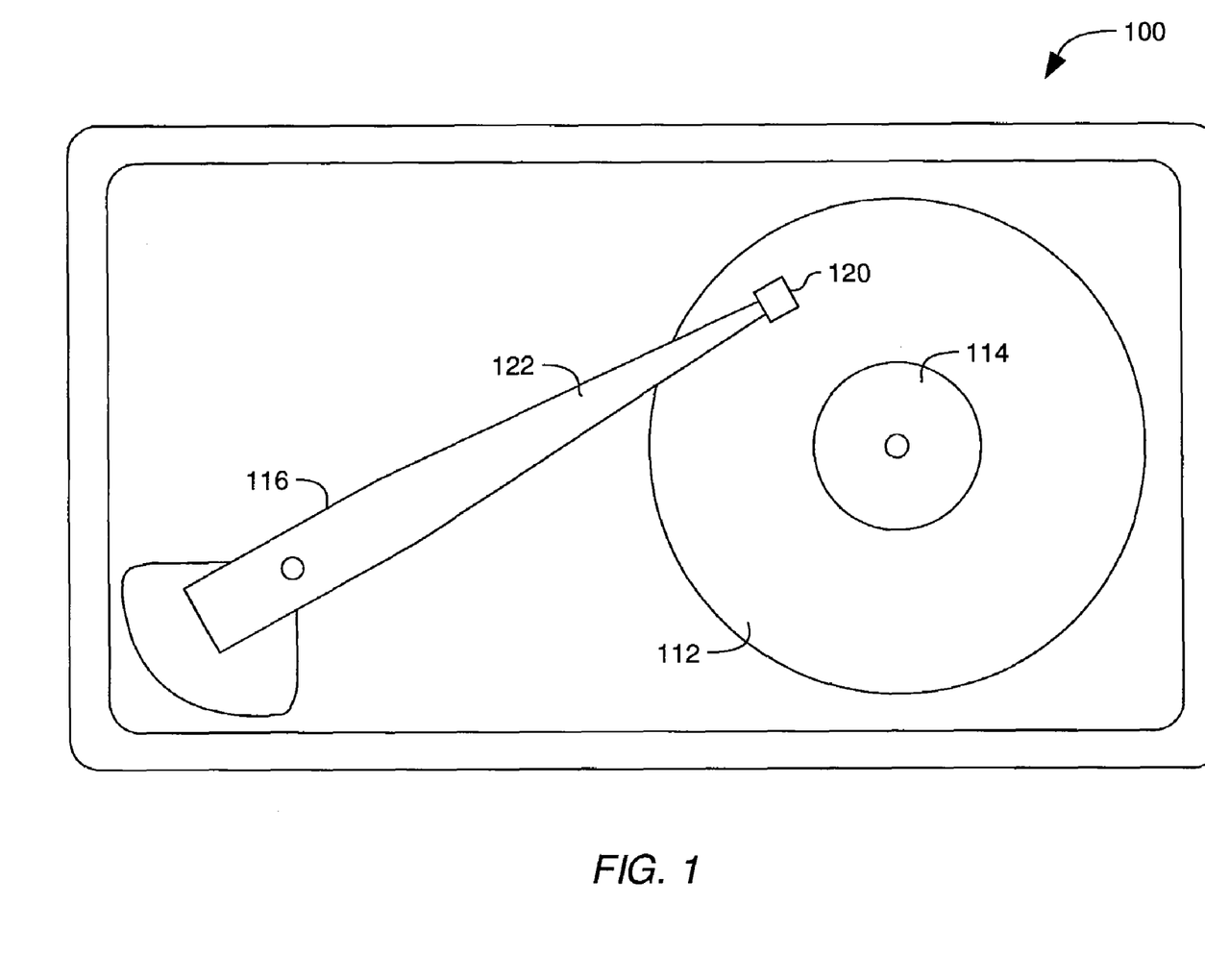
FIG. 1 is a block diagram depicting a hard drive according to one embodiment of the invention.

FIG. 1 is a block diagram depicting a hard drive 100 according to one embodiment of the invention. The hard disk drive 100 includes a magnetic media hard disk 112 mounted upon a motorized spindle 114. An actuator arm 116 is pivotally mounted within the hard disk drive 100 with a slider 120 disposed upon a distal end 122 of the actuator arm 116. During operation of the hard disk drive 100, the hard disk 112 rotates upon the spindle 114 and the slider 120 acts as an air bearing surface (ABS) adapted for flying above the surface of the disk 112. The slider 120 includes a substrate base upon which various layers and structures that form a magnetic reader are fabricated. Magnetic read sensors disclosed herein can be fabricated in large quantities upon a substrate and subsequently sliced into discrete magnetic read/write sensors for use in devices such as the hard disk drive 100.

Layers of a Magnetic Read Sensor

Figure 2:
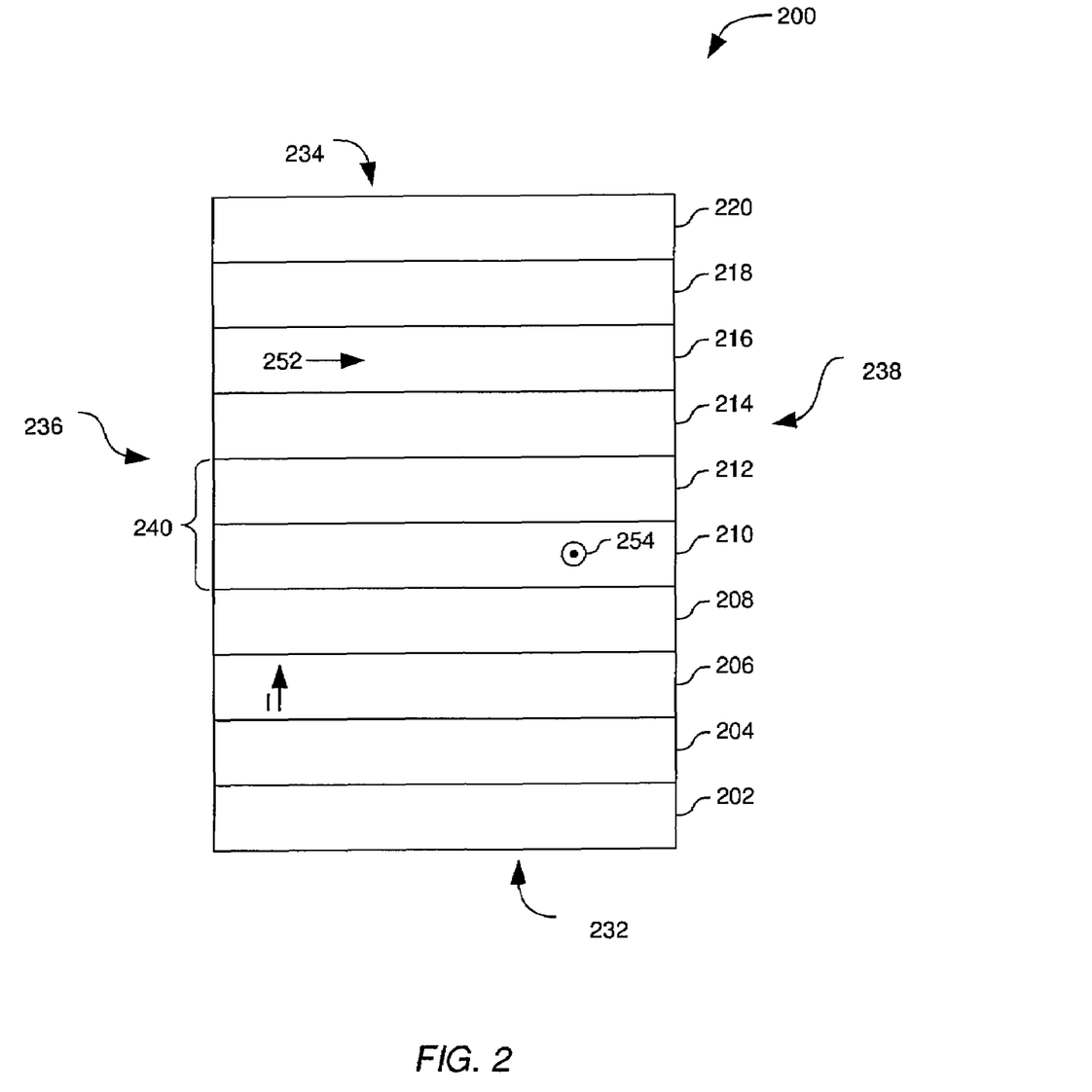
FIG. 2 is a block diagram depicting layers of a magnetic read sensor according to one embodiment of the invention.

FIG. 2 is a block diagram depicting layers of a magnetic read sensor 200 according to one embodiment of the invention. As depicted, the magnetic read sensor 200 may include a bottom side 232, top side 234, a side 236 facing the air bearing surface, and a back side 238. In the depicted embodiment, a top-spin valve type magnetic read sensor 200 is shown because the magnetic read sensor 200 has a pinned layer 216 which is located towards the top side 234 of the magnetic read sensor 200, above the free layer 240. In some cases, the pinned layer may be a simple single layer or an anti-parallel (AP) pinned layer comprising of two pinned layers separated by a Ruthenium (Ru) coupling layer. The magnetic moments of these pinned layers may be antiferromagnetically coupled. The current I may be in-plane of the magnetic sensor layers for a current in plane (CIP) sensor and perpendicular to the layers (as depicted) for a current perpendicular to plane (CPP) plane sensor.

In one embodiment, the magnetic read sensor 200 may include a substrate 202 and initial underlayers 204, 206 of nickel-iron-chromium (NiFeCr), and nickel-iron (NiFe) and back or spin filter layer 208 of copper (Cu). The layers 204, 206, 208 (NiFeCr/NiFe/Cu) together form a bilayer seed layer which, by increasing an effective mean free path of electrons in the magnetic read sensor 200 may increase the giant magnetoresistance (GMR) of the magnetic read sensor. The layer 204 of NiFeCr may be, for example, 32 angstroms (Å) thick. The layer 206 of NiFe may be, for example, 5 Å thick and layer 208 of Cu deposited on the underlayers 204, 206 may be 6 Å thick.

In one embodiment, the magnetic read sensor 200 may include a free layer 240 which includes a first layer 210 of nickel-iron and a second layer 212 of cobalt-iron. The first layer 210 may, for example, be 15.5 Å thick and contain 15 atomic percent (at. %) iron. The second free layer, referred to as a dusting layer 212 may, for example, be 10.3 Å thick and contain 18 at. % iron. A spacer layer 214 of Cu may be deposited on the free layer 240. The spacer layer 214 may, for example, be 20 Å thick. In one embodiment, the free layer 240 may have a magnetic moment 254 (parallel to the ABS) which may be changed, e.g., due a field emanating from magnetic charges stored at the magnetic transitions on a disk 112.

In one embodiment, the magnetic read sensor 200 may include a pinned layer 216 which has a magnetic moment 252 (e.g., either substantially into or out of the read sensor 200 or ABS) which is pinned by an antiferromagnetic (AFM) pinning layer 218. The pinned layer 216 may, for example, be made of cobalt-iron (CoFe). The pinned layer 216 may be 20 Å thick. Also, as described below, in one embodiment, the pinned layer 216 may contain about 35 at. % iron. While the magnetic read sensor 200 is depicted in FIG. 2 includes a single pinned layer 218 (referred to as a simple top spin valve), in some cases, the magnetic read sensor 200 may be an antiparallel pinned (APP) top spin valve (also referred to as a synthetic top spin valve) in which the pinned layer 216 includes an additional layer of ruthenium (Ru) and an additional layer of cobalt-iron (CoFe) between the pinned layer 216 and the spacer layer 214 (e.g., resulting in the layers Cu/CoFe/Ru/Co-35 at. % Fc/IrMn). In one embodiment, the ruthenium layer in the complicated spin valve may be 3 to 10 Å thick. For example, the Ru layer may be 4 Å or 8 Å thick.

In one embodiment, the pinning layer 218 may be made of iridium-manganese (IrMn), iridium-manganese-chromium (IrMnCr), or any other appropriate AFM pinning material. For example, the pinning layer 218 may be 50 to 80 Å thick iridium-manganese (IrMn) with 20.5 at. % iridium. In one embodiment, the pinning layer may be about 75 Å thick IrMn. A capping layer 220 of tantalum (Ta) may be deposited on the pinning layer 218. The capping layer 220 may, for example, be 40 Å thick.

In general, the depicted layers are exemplary layers and a magnetic read sensor 200 may, in some cases, contain more layers or fewer layers at different thicknesses as known to those skilled in the art. Similarly, materials other than those shown may be used for given layers as known to those skilled in the art. Greater detail regarding the manufacture of the read sensor 200 is provided below with respect to FIGS. 3-6.

Method for Manufacturing the Magnetic Read Sensor

Figure 3:
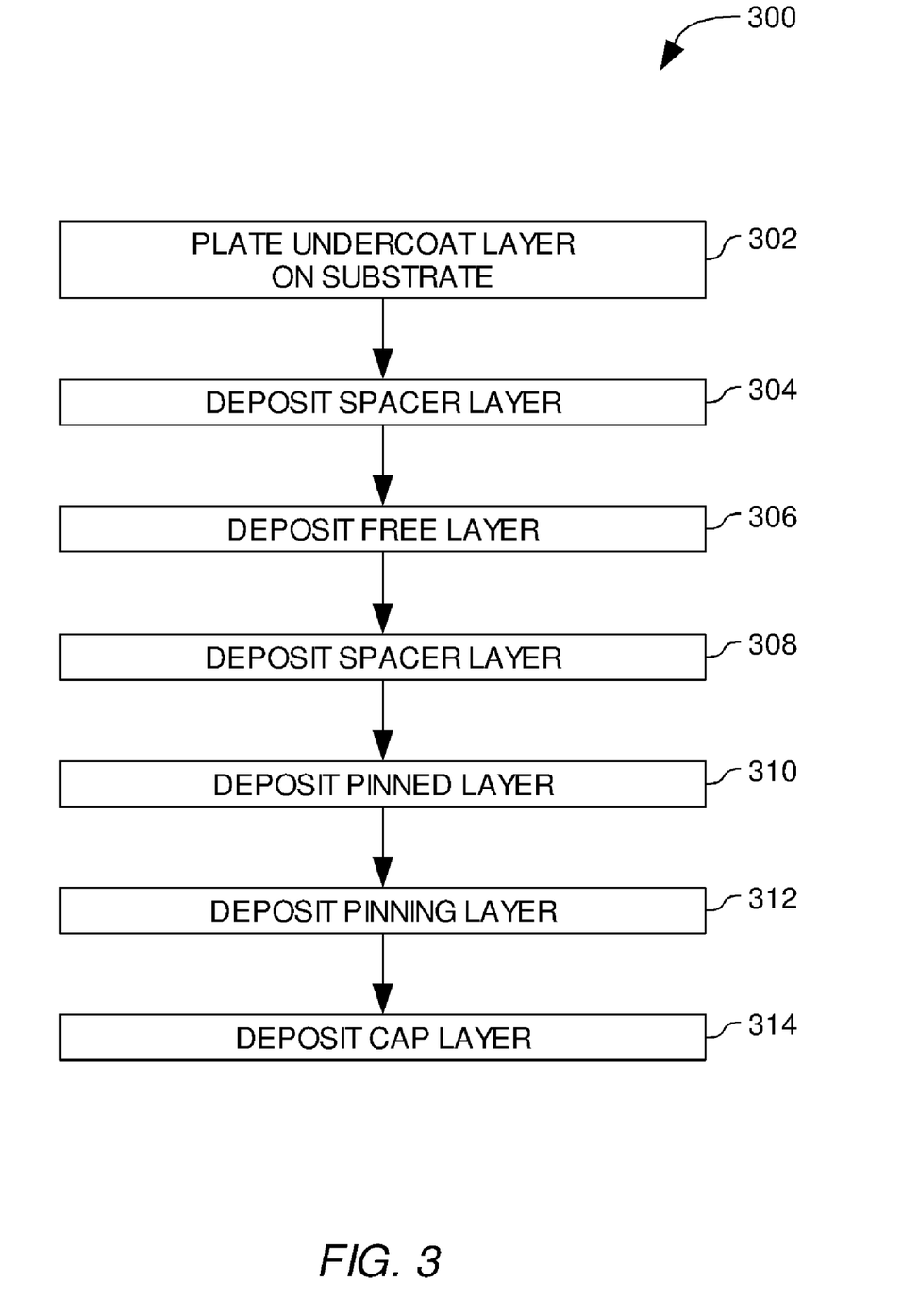
FIG. 3 is a block diagram depicting a process for manufacturing a magnetic read sensor according to one embodiment of the invention.

FIG. 3 is a block diagram depicting a process 300 for manufacturing a magnetic read sensor 200 according to one embodiment of the invention. As depicted, the process 302 may begin at step 302 where the seed layers 204, 206 may be deposited on a substrate 202. At step 304, a spin filter layer 208 may be deposited. Then, at step 306, the free layer 240 (including first and second layers 210, 212) may be deposited, followed by the spacer layer 214 which is deposited at step 308.

At step 310, the pinned layer 216 may be deposited. As described below, the pinned layer 216 may be formed from cobalt with around 35 at. % iron. Then, at step 312, the pinning layer 218 may be deposited. At step 314, the capping layer 220 may be deposited. The resulting layers are depicted in FIG. 2. As described above, in some cases, the magnetic read sensor 200 may include additional layers or fewer layers as desired. The process 300 of manufacturing the magnetic read sensor 200 also include additional steps as known to those skilled in the art, such as milling of the magnetic read sensor 200, deposition of hard bias to stabilize free layer's magnetic moment parallel to the ABS, chemical-mechanical polishing of the magnetic read sensor 200, etc.

Properties of the Pinned Layer of the Magnetic Read Sensor

As described below, composition of the pinned layer 216 may be varied in order to provide improved operating properties (e.g., pinning field Hp, coercivity Hcp, and blocking temperature Tb). Specifically, as described below, the atomic percentage of iron (at. % Fe) of the pinned layer 216 may be adjusted to maximize the pinning field Hp and maintain a low coercivity Hcp without adversely affecting the blocking temperature Tb. In order to select an appropriate at. % Fe, the magnetic sensor 200 may be manufactured with a variety of compositions. Results of such manufacturing are depicted below in FIGS. 4-6.

Figure 4:
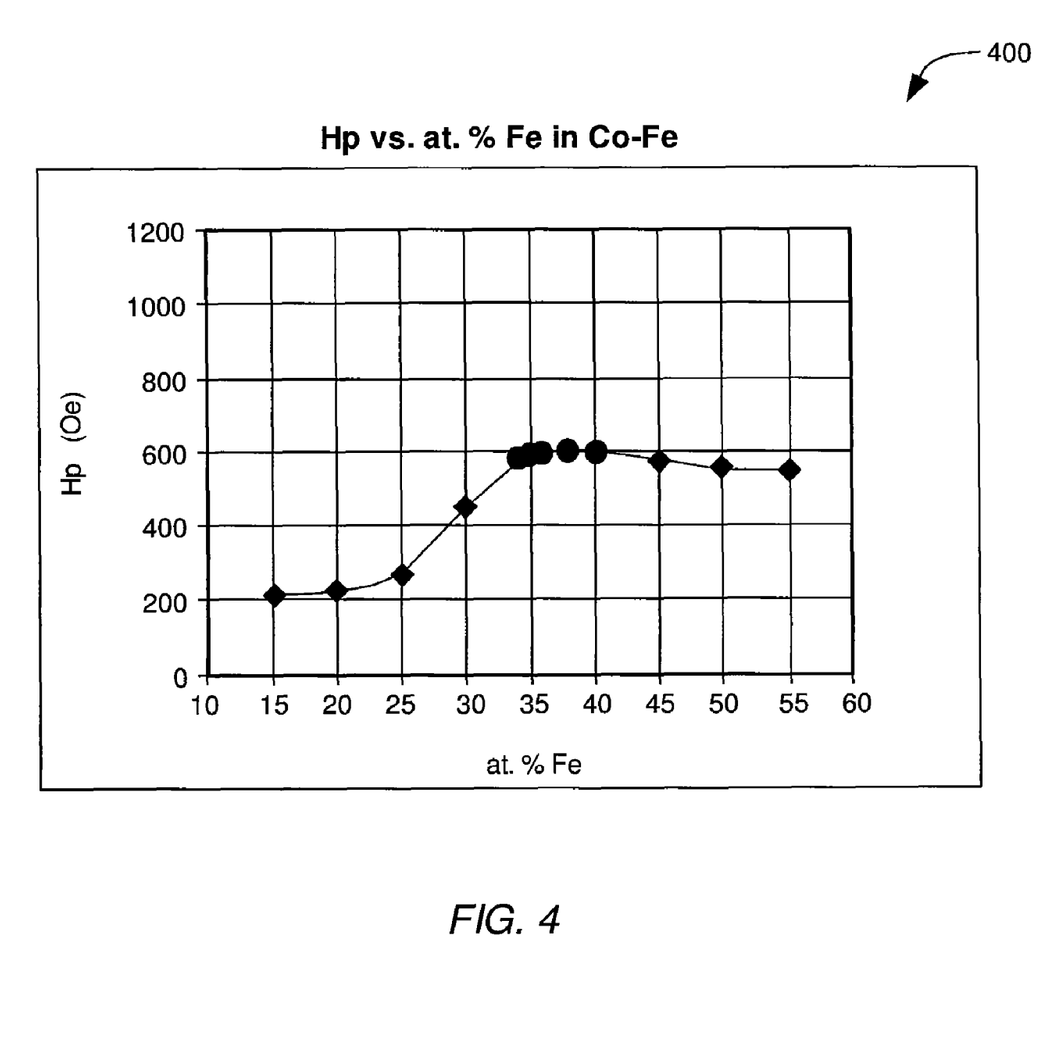
FIG. 4 is a graph depicting pinning fields of magnetic read sensors according to one embodiment of the invention.

FIG. 4 is a graph 400 depicting pinning field strengths (Hp) of a pinned layer of magnetic read sensors with various pinning layer compositions according to one embodiment of the invention. As described above, larger pinning field strength is typically desired for operation of a magnetic read sensor 200. Thus, as depicted, a magnetic read sensor 200 with a pinned layer 216 having 33 to 40 at. % iron may provide an improved pinning field Hp with respect to other compositions of iron. The pinning field Hp for the range of 33 to 40 at. % iron may be between 575 and 625 oersteds (Oe) (e.g., about 600 Oe).

Figure 5:
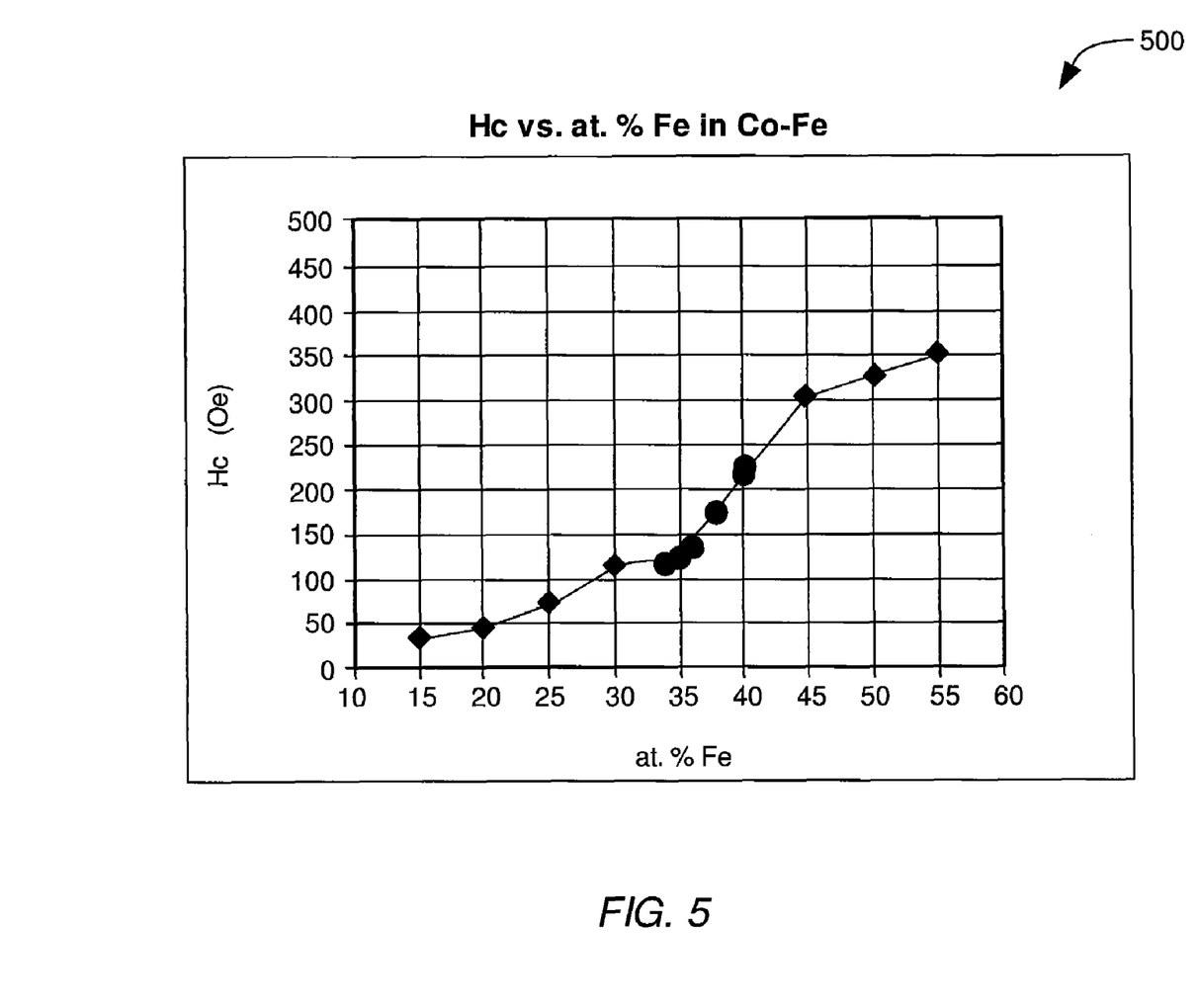
FIG. 5 is a graph depicting coercivity of magnetic read sensors according to one embodiment of the invention.

FIG. 5 is a graph 500 depicting coercivity values (Hcp) of a pinned layer 216 of magnetic read sensors with various pinning layer compositions according to one embodiment of the invention. As described above, lower coercivity values are typically desired for manufacture and operation of a magnetic read sensor 200. Thus, as depicted, a magnetic read sensor 200 with a pinned layer 216 having under 37 at. % iron may provide a low coercivity Hcp with respect to other compositions of iron. The coercivity value Hcp may be, for example, between 120 and 150 for a range of 33 to 37 at. % iron. Such a range of 33 to 37 at. % iron in the pinned layer 216 may be selected to provide improved pinning field values and coercivity values for the pinned layer 216. For example, in one embodiment, the pinned layer 216 may be manufactured with 35 at. % iron to provide an increased pinning field with a reduced coercivity (e.g., with respect to other possible compositions of the pinned layer 216).

Figure 6:
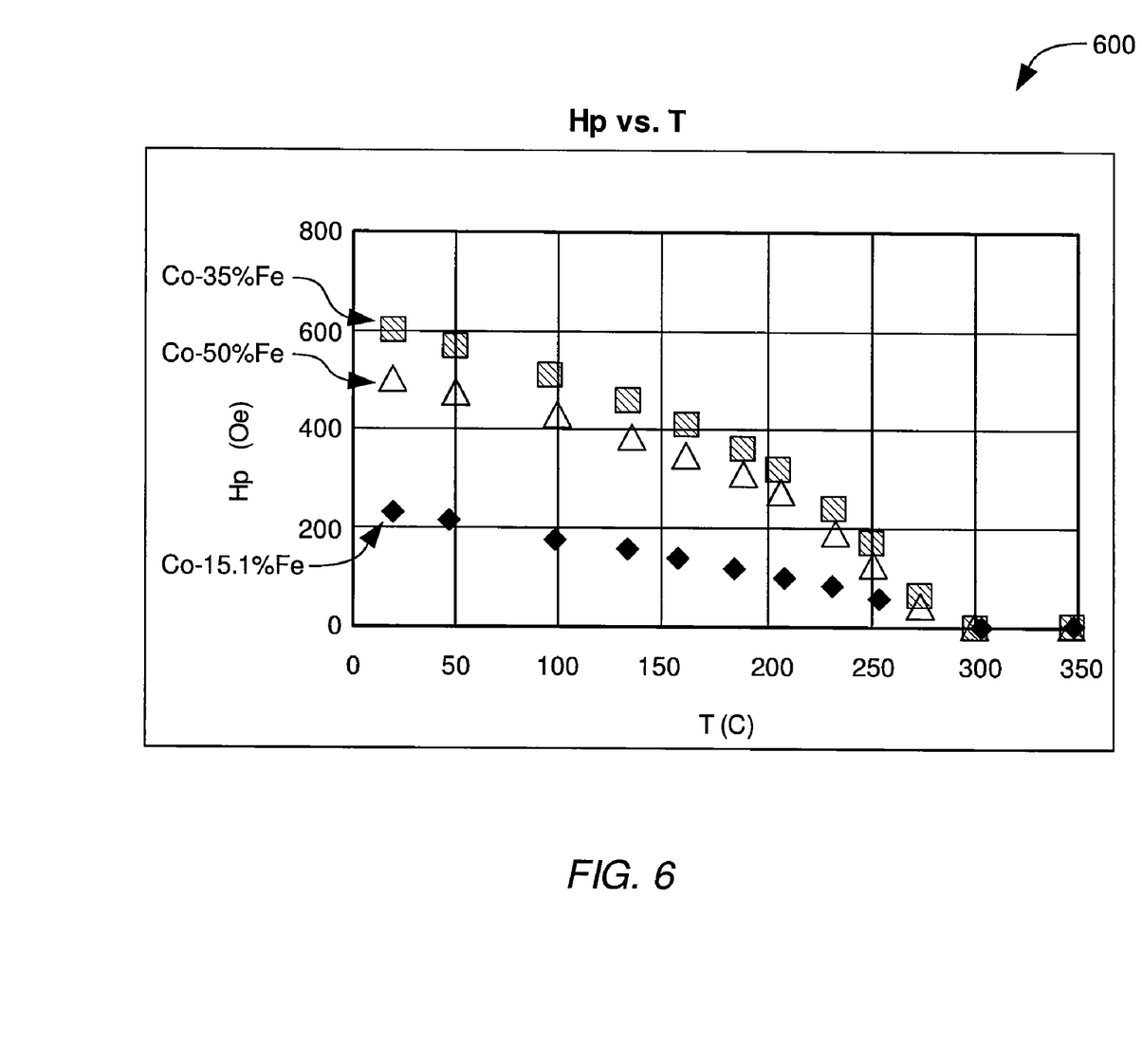
FIG. 6 is a graph depicting blocking temperatures of magnetic read sensors according to one embodiment of the invention.

FIG. 6 is a graph 600 depicting blocking temperatures (Tb) of AFM/pinning layer couple of magnetic read sensors with various pinning layer compositions according to one embodiment of the invention. As described above, the blocking temperature Tb is the temperature at which the pinning field Hp of the pinned layer 216 goes to zero. Typically, a high bock temperature Tb is desired for manufacture and operation of a magnetic read sensor 200. As depicted in FIG. 6, the blocking temperature Tb of a magnetic read sensor 200 with a pinned layer 216 having 35 at. % iron may not have a reduced blocking temperature Tb with respect to other possible compositions (e.g., 50 at. % iron or 15.1 at. % iron). As depicted, the blocking temperature may be about 280 degrees Celsius (C).

As described above, embodiments of the invention may be utilized with a top spin valve having a Co—Fe pinned layer 216 containing about 35 at. % iron. The top spin valve may be a current-in-plane (CIP) top spin valve or current-perpendicular-to-plane (CPP) top spin valve. Embodiments of the invention may also be used with dual spin valves (e.g., a magnetic read sensor with a bottom pinned layer and a top pinned layer, wherein the top pinned layer of the dual spin valve contains cobalt with 35 at. % iron). One embodiment of a dual spin valve may includes the layers of seed/AFM1/PL1/Cu/FL/Cu/PL2/AFM2/cap where seed is a seed layer, AFM1 is a first antiferromagnetic layer, PL1 and PL2 are first and second pinned layers, AFM2 is a second antiferromagnetic layer, and cap is a capping layer. The dual spin valves may be CIP dual spin valves or CPP dual spin valves. The dual spin valves may also have simple (Co-35 at. % Fc/IrMn) or synthetic pinned layers (CoFe/Ru/Co-35 at. % Fe/IrMn), with the pinned layer 216 adjacent to the pinning layer 218 having the composition described above. Also, embodiments of the invention may be utilized in the pinned layer of a top pinned layer in a tunneling magnetoresistive (TMR) read sensor. Where a TMR sensor is utilized, the sensor may include a barrier layer of Magnesium Oxide (MgOx), Titanium Oxide (TiOx), Aluminum Oxide (AlOx), or any other appropriate barrier layer known to those skilled in the art.

CONCLUSION

As described above, embodiments of the invention provide a magnetic read sensor and a method for manufacturing a magnetic read sensor. The method includes providing a seed layer disposed over a substrate of the magnetic read sensor, providing a free layer disposed over the seed layer, and providing a spacer layer disposed over the free layer. The method further includes providing a pinned layer disposed over the spacer layer. In one embodiment, the pinned layer includes cobalt and iron, wherein the concentration of iron in the pinned layer is between 33 and 37 atomic percent (at. %). The method further includes providing a pinning layer disposed over the pinned layer, wherein the pinning layer is in contact with the pinned layer. In some cases, such a magnetic read sensor may have a pinned layer with an increased pinning field and a low coercivity without any adverse effect on the blocking temperature of the pinned layer.

While the foregoing is directed to embodiments of the present invention, other and further embodiments of the invention may be devised without departing from the basic scope thereof, and the scope thereof is determined by the claims that follow.

What is claimed is:

1. A method for manufacturing a magnetic read sensor, the method comprising:
   providing a seed layer disposed over a substrate of the magnetic read sensor, providing a free layer disposed over the seed layer, providing a spacer layer disposed over the free layer;
   providing a pinned layer disposed on the spacer layer, wherein the pinned layer comprises cobalt and iron, wherein the concentration of iron in the pinned layer is between 33 and 37 atomic percent (at. %); and
   providing a pinning layer disposed on the pinned layer, wherein the pinning layer is in contact with the pinned layer.

2. The method of claim 1, wherein the concentration of iron in the pinned layer is 35 atomic percent.

3. The method of claim 1, wherein the pinned layer is 15 to 80 angstroms thick.

4. The method of claim 3, wherein the pinned layer is 75 angstroms thick.

5. The method of claim 1, wherein the magnetic read sensor is one of a top-spin valve, a dual spin valve, and a top tunneling magnetoresistive read sensor.

6. The method of claim 1, wherein the spacer layer comprises copper.

7. The method of claim 1, further comprising providing a barrier layer.

8. The method of claim 1, wherein depositing the pinned layer comprises:
   providing a first pinned layer comprising cobalt-iron (CoFe) disposed over the spacer layer;
   providing a layer of ruthenium disposed over the first pinned layer; and
   providing a second pinned layer disposed over the layer of ruthenium, wherein the second pinned layer comprises cobalt and iron, wherein the concentration of iron in the second pinned layer is between 33 and 37 atomic percent (at. %), and wherein the pinning layer is in contact with the second pinned layer.

9. The method of claim 1, wherein the pinning layer consists essentially of iridium-manganese (IrMn).

10. The method of claim 1, wherein the pinning layer comprises manganese and iridium.

11. The method of claim 10, wherein the pinning layer consists essentially of iridium-manganese-chromium (IrMnCr).

12. The method of claim 1, wherein a pinning field of the pinned layer is greater than 575 oersteds.

13. The method of claim 1, wherein the coercivity of the pinned layer is less than 150 oersteds.

14. The method of claim 1, further comprising
   depositing the seed layer over the substrate of the magnetic read sensor,
   depositing the free layer over the seed layer;
   depositing the spacer layer over the free layer;
   depositing the pinned layer on the spacer layer; and
   depositing the pinning layer on the pinned layer.

15. A magnetic read sensor, comprising:
   a seed layer disposed over a substrate of the magnetic read sensor;
   a free layer disposed over a seed layer;
   a spacer layer disposed over the free layer;
   a pinned layer disposed on the spacer layer, wherein the pinned layer comprises cobalt and iron, wherein the concentration of iron is between 33 and 37 atomic percent (at. %); and
   a pinning layer disposed on the pinned layer, wherein the pinning layer is in contact with the pinned layer.

16. The magnetic read sensor of claim 15, wherein the concentration of iron in the pinned layer is 35 atomic percent.

17. The magnetic read sensor of claim 15, wherein the magnetic read sensor is one of a top-spin valve, a dual spin valve, and a top tunneling magnetoresistive read sensor.

18. The magnetic read sensor of claim 15, wherein the pinned layer comprises:
   a first pinned layer comprising cobalt-iron (CoFe) disposed over the spacer layer;
   a layer of ruthenium disposed over the first pinned layer; and
   a second pinned layer disposed over the layer of ruthenium, wherein the second pinned layer comprises cobalt and iron, wherein the concentration of iron in the second pinned layer is between 33 and 37 atomic percent (at. %), and wherein the pinning layer is in contact with the second pinned layer.

19. The magnetic read sensor of claim 15, wherein the pinning layer consists essentially of one of iridium-manganese (IrMn) and iridium-manganese-chromium (IrMnCr).

20. The magnetic read sensor of claim 15, wherein a pinning field of the pinned layer is greater than 575 oersteds.

21. The magnetic read sensor of claim 15, wherein the coercivity of the pinned layer is less than 150 oersteds.

22. A hard drive, comprising:
   a magnetic disk;
   an arm rotatably mounted to move over the magnetic disk; and
   a magnetic read sensor connected to an end of the arm, wherein the magnetic read sensor is one of a top-spin valve, a dual spin valve, and a top tunneling magnetoresistive read sensor, the magnetic read sensor comprising:
      a pinned layer disposed on a spacer layer, wherein the pinned layer comprises cobalt and iron, wherein the concentration of iron is between 33 and 37 atomic percent (at. %); and
      a pinning layer disposed on the pinned layer, wherein the pinning layer is in contact with the pinned layer.

23. The hard drive of claim 22, wherein the concentration of iron in the pinned layer is 35 atomic percent.

24. The hard drive of claim 22, wherein the pinned layer comprises:
   a first pinned layer comprising cobalt-iron (CoFe) disposed over the spacer layer;
   a layer of ruthenium disposed over the first pinned layer; and
   a second pinned layer disposed over the layer of ruthenium, wherein the second pinned layer comprises cobalt and iron, wherein the concentration of iron in the second pinned layer is between 33 and 37 atomic percent (at. %), and wherein the pinning layer is in contact with the second pinned layer.

25. The hard drive of claim 22, wherein the pinning layer consists essentially of one of iridium-manganese (IrMn) and iridium-manganese-chromium (IrMnCr).

26. The hard drive of claim 22, wherein a pinning field of the pinned layer is greater than 575 oersteds.

27. The hard drive of claim 22, wherein the coercivity of the pinned layer is less than 150 oersteds.

* * * * *